United States Patent [19]

Lee

[11] Patent Number: 5,754,236
[45] Date of Patent: May 19, 1998

[54] VARIABLE BIT RATE CODING USING THE BFOS ALGORITHM

[75] Inventor: Kwang-kee Lee, Kyungki-do, Rep. of Korea

[73] Assignee: Samsung Electronics Co., Ltd., Suwon, Rep. of Korea

[21] Appl. No.: 654,116

[22] Filed: May 28, 1996

[30] Foreign Application Priority Data

May 29, 1995 [KR] Rep. of Korea ............. 95-13683

[51] Int. Cl.⁶ .................................................. H04N 7/24
[52] U.S. Cl. ............................................. 348/405; 348/415
[58] Field of Search ........................... 348/405, 416, 348/415, 409, 402, 401, 400, 390, 384; 382/251, 238, 236, 232; H04N 7/137

[56] References Cited

U.S. PATENT DOCUMENTS 5,515,388  5/1996  Yagasaki ............................ 348/405
5,559,557  9/1996  Kato .................................. 348/405

OTHER PUBLICATIONS

Kwang Kee Lee et al., "On variable bit rate video coding and multiplexing," *IEEE ICCE*, Jun. 1995, pp. 84–85.

E.A. Riskin, "Optimal Bit Allocation via the Generalized BFOS Algorithm," *IEEE Transactions on Information Theory*, vol. 37, No. 2, Mar. 1991, pp. 400–402.

*Primary Examiner*—Bryan S. Tung
*Attorney, Agent, or Firm*—Burns, Doane, Swecker & Mathis, L.L.P.

[57] ABSTRACT

A variable bit rate video (VBR) coding method includes the steps of (a) dividing an entire sequence of moving pictures into N blocks, (b) determining a quantizer scale group having M elements, each element being applied to MPEG I, P, and B pictures, (c) quantizing the N blocks divided in step (a) by the M quantizer scales determined in step (b), (d) producing M×N bit rate-distortion pairs as a result of step (c), (e) assigning optimal bits to the N blocks divided in step (a) by applying the BFOS algorithm to the M×N bit rate-distortion pairs produced in step (d), and (f) variable bit rate-coding the entire sequence of moving pictures by using the optimal number of bits assigned to each block in step (e). Therefore, the VBR video coding method can minimize distortion resulting from coding by variably assigning a given total number of bits to each block of an entire sequence of moving pictures, and allocation of more bits to a very significant portion of a moving picture leads to a better, more uniform picture quality with a lower average bit rate than in constant bit rate coding.

4 Claims, 2 Drawing Sheets

VARIABLE BIT RATE CODING USING THE BFOS ALGORITHM

BACKGROUND OF THE INVENTION

The present invention relates to a variable bit rate (VBR) video coding method, and more particularly, to a VBR video coding method using an optimal bit allocation algorithm.

Information magnitudes for moving picture coding varies with temporal and spatial characteristics of a video signal, for example, image complexity, motion, and image changeover. Constant bit rate (CBR) coding can reduce the variations in the number of generated bits by temporarily storing excess information generated from a very complex image portion to buffer. However, time delay and cost considerations impose constraints on buffer size, and the number of bits generated should be decreased to prevent buffer overflow. Despite the advantage of consistent CBR, such adjustments degrade the quality of a very complex portion of an image, and lead to unnecessary waste of bits assigned to a simple portion of the image. Restoring a coded image at the CBR may cause a large variation in picture quality. That is, restoring an image at the CBR can result in non-uniform distortion distribution depending on image complexity. The human eye reacts sensitively to distortion in general and to non-uniform distortion distribution in particular. Meanwhile, VBR coding can assign bits according to image complexity, if necessary, thus maintaining a uniform picture quality.

In MPEG-type (Motion Picture Experts Group standard) video coding, quantizer scale is the key parameter controlling picture quality and the number of bits generated. The larger the quantizer scale, the smaller the number of bits generated. In CBR coding, a rather complex bit rate controlling algorithm is required to dynamically vary the quantizer scale. This algorithm is performed using feedback control of a buffer for coding and thus leads to picture quality variation. On the other hand, the VBR coding assigns as many bits as necessary, thereby providing a better, more uniform picture quality at an average bit rate lower than that of the CBR coding.

SUMMARY OF THE INVENTION

The object of the present invention is to provide a variable bit rate video coding method for use in a variable bit rate video coding device, in which optimal bit allocation is performed using the Breiman, Friedman, Olshen, and Stone (BFOS) algorithm and then a corresponding block is coded at a variable bit rate based on the optimal bit allocation, to minimize the overall distortion of an encoder under constraints set by a given total bit number and a maximum transmission rate.

To achieve the above object of the present invention, there is provided a variable bit rate video coding method comprising the steps of: (a) dividing an entire sequence of moving pictures into N blocks; (b) determining a quantizer scale group having M elements, each element being applied to MPEG I, P, and B pictures; (c) quantizing the N blocks divided in the step (a) by the M quantizer scales determined in the step (b); (d) producing M×N bit rate-distortion pairs as a result of the step (c); (e) assigning optimal bits to the N blocks divided in the step (a) by applying the BFOS algorithm to the M×N bit rate-distortion pairs produced in the step (d); and (f) variable bit rate-coding the entire sequence of moving pictures by using the optimal number of bits assigned to each block in the step (e).

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

A preferred embodiment of the present invention will be described in detail referring to the attached drawings.

Figure 1:
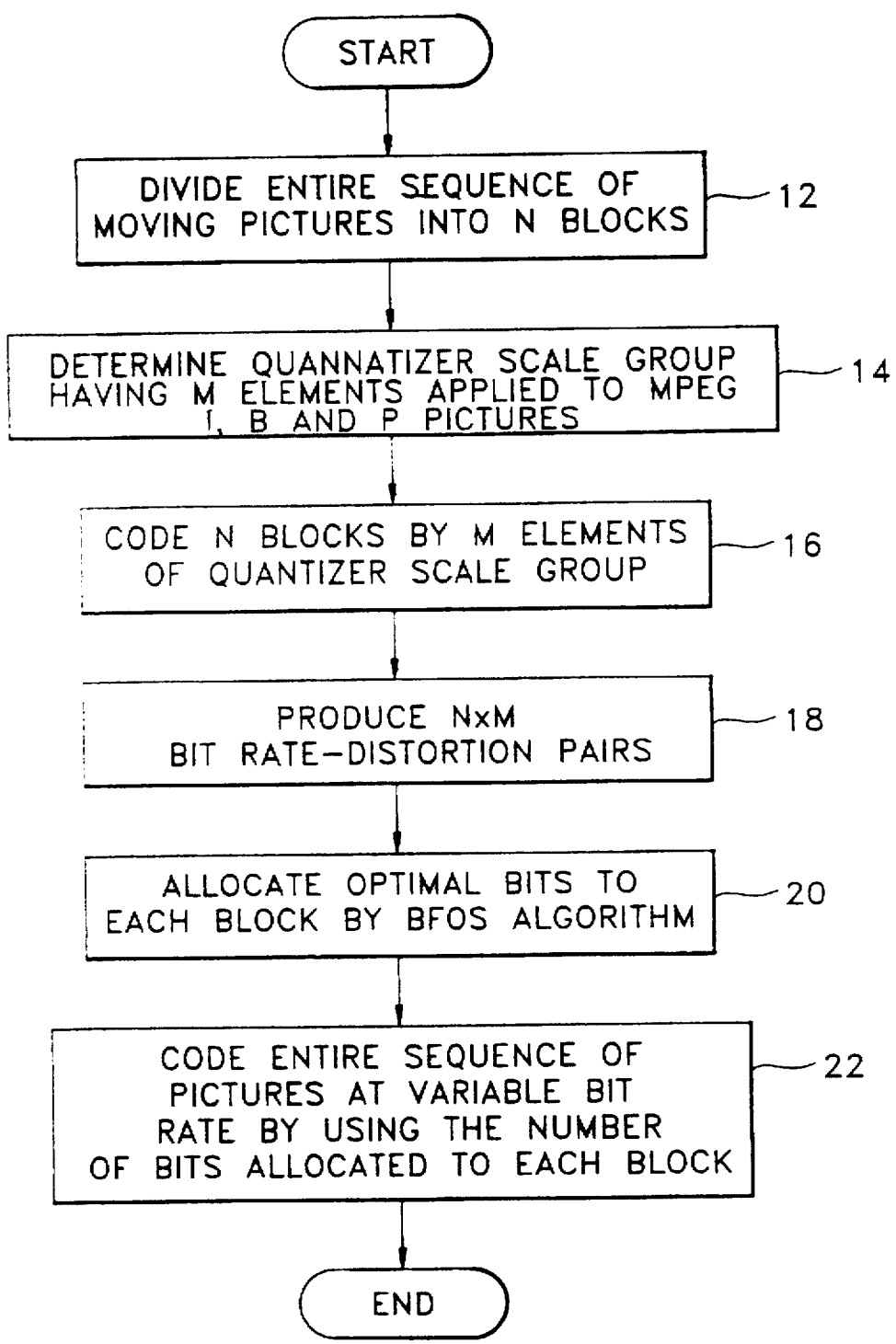
FIG. 1 is a flowchart for explaining a VBR video coding method of the present invention.

Referring to FIG. 1, an entire sequence of moving pictures is divided into N blocks in step 12. In step 14, a group of quantizer scales having M elements applied to MPEG I, B and P pictures is set. In step 16, the divided N blocks are quantized by using the M quantizer scales. In step 18, M×N bit rate-distortion pairs are generated as a result of the quantization. In step 20, optimal bits are allocated to the N blocks by applying the BFOS algorithm to the M×N bit rate-distortion pairs. In step 22, the entire sequence of moving pictures is VBR-coded by using the number of optimal bits allocated to each block.

The operation of the present invention as outlined in FIG. 1 will be described referring to FIGS. 2 and 3.

First, the entire sequence of moving pictures is divided into N blocks in step 12. In the case of MPEG, a block can be defined as a macroblock, picture, or group of pictures (GOP).

In step 14, the quantizer scale elements $Q_j (j=1, \ldots, M)$ in the form of $Q_j=(Q_{j(I)}, Q_{j(P)}, Q_{j(B)})$ are determined to be applied to MPEG I, P, and B pictures. Here, $Q_{j(I)} \leq Q_{j(P)} \leq Q_{j(B)}$, and the quantizer scale group is determined to satisfy $Q_{j+1(I)} \leq Q_{j(I)}, Q_{j+1(P)} \leq Q_{j(P)}, Q_{j+1(B)} \leq Q_{j(B)}$.

In step 16, the N blocks divided in step 12 are coded using given M quantizer scales.

In step 18, M×N bit rate-distortion pairs are generated as a result of the coding of step 16.

In step 20, optimal bits are allocated to the N blocks divided in step 12 by applying the BFOS algorithm to the M×N bit rate-distortion pairs generated in step 18.

The purpose of the optimal bit allocation is to allocate a given number of bits so as to minimize overall distortion of an encoder. Generally, the optimal bit allocation satisfies the following condition:

$$\min \left( \sum_{i=1}^{N} D(i) \right), \text{ here } \sum_{i=1}^{N} R(i) \leq R_{total} \quad (1)$$

where N is the total number of blocks to be coded, $R_{total}$ is the given total number of bits, and $D(i)$ and $R(i)$ indicate distortions and the number of bits generated during an (i)th block coding, respectively. Given an available quantizer scale group, optimal bit allocation is equated in significance to optimal choice of quantizer scales for coding each block. Assuming that $D(i, j)$ and $R(i, j)$ are distortions and the number of bits generated when the (i)th block is coded by a (j)th element of the given quantizer scale group, $$\min \left( \sum_{i=1}^{N} D(i,j) \right), \text{ here } \sum_{i=1}^{N} R(i,j) \leq R_{total} \quad (2)$$

The optimal answer satisfying the above equation (2) can be obtained by the BFOS algorithm. In the BFOS algorithm, the optimal bit allocation is considered a bit allocation tree constructing and pruning procedure.

The bit allocation tree will be described referring to FIG. 2.

Figure 2:
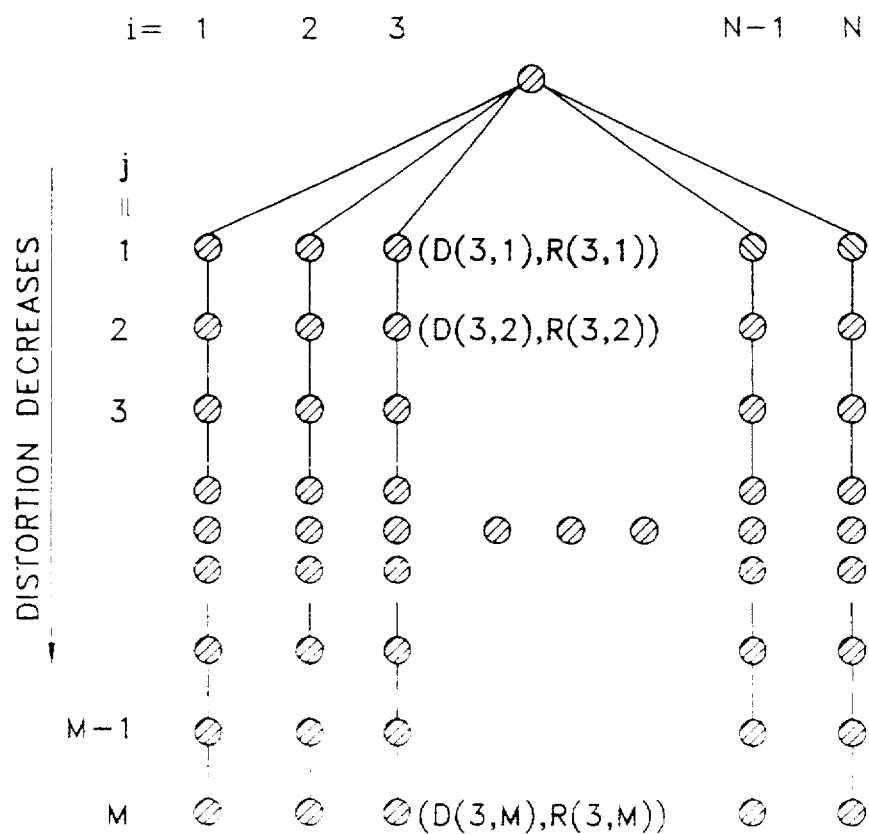
FIG. 2 is a diagram illustrating the structure of a bit allocation tree used in the present invention.

In the bit allocation tree of FIG. 2, a root node has N children each corresponding to a block to be coded. Each subtree rooted at one of the N children is a unary tree of a length M. Here, M is the size of the quantizer scale group. Each node has distortion $D(i, j)$ and the number of bits $R(i, j)$ produced when the (i)th block (i=1, . . . , N) is coded by a (j)th quantizer scale (j=1, . . . , M), in the bit allocation tree excluding the root node. That is, a bit rate-distortion pair $(D(i, j), R(i, j))$ produced when a particular block is coded is given to each node $(i, j)$. It is assumed that as j increases, $D(i, j)$ decreases gradually, and $R(i, j)$ increases gradually, for every block i(i=1, . . . , N). The BFOS algorithm is performed in the following order, under the constraints of the total number of bits, $R_{total}$, and a maximum transmission rate $r_{max}$.

1) For i=1, . . . , N, set $M_i=M$
2) For i=1, . . . , N and j=1, . . . , $M_i$−1, calculate $S(i, j)$ by $$S(i,j) = -\frac{D(i,j) - D(i,M_i)}{R(i,j) - R(i,M_i)} \quad (3)$$

3) Select $S(i, j)$ which minimizes the above equation (3), satisfying $R(i, j) \leq r_{max}$. Let i, and j be K and l, and respectively $M_K=1$.

4) Repeat steps 2) and 3) until the following equation (4) is satisfied.

$$\sum_{i=1}^{N} + R(i,M_i) \leq R_{total} \quad (4)$$

Equation (3) indicates the ratio of increase of distortion to decrease of allocated bits when the vertical end node of each subtree is changed from node $(i, M_i)$ to node $(i, j)$, that is, when a quantizer scale value $Q_{Mi}$ for coding an ith block is changed into $Q_j$. Meanwhile, in step 3), branches of a node that minimize the increase of distortion with respect to the decrease of allocated bits are pruned off.

Figure 3:
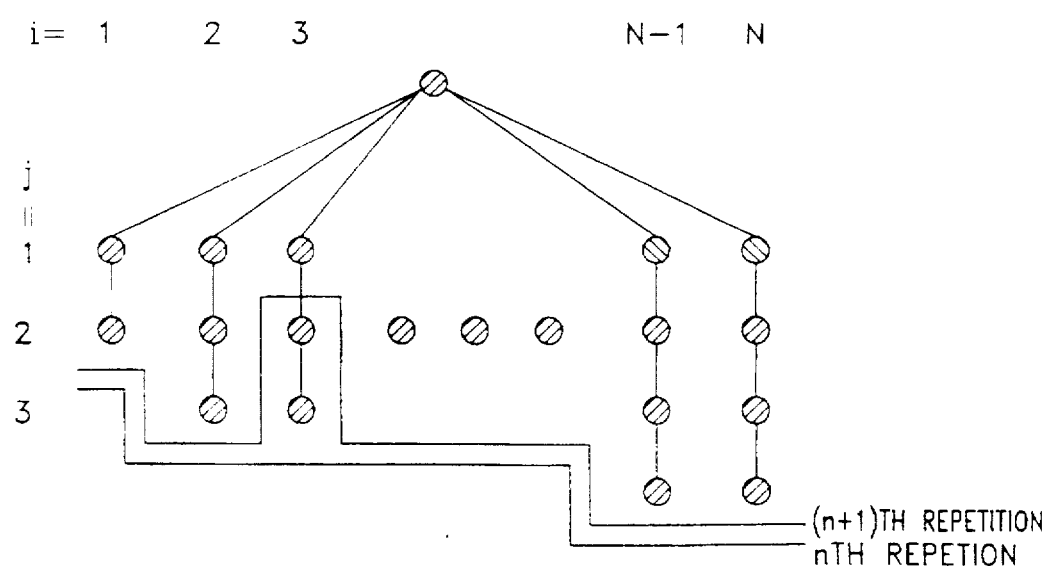
FIG. 3 illustrates an example of pruning the bit allocation tree of FIG. 2.

In FIG. 3, nth and (n+1)th pruning is illustrated. In this example, the increase of the quantizer scale value $Q_3$ for the third block to $Q_1$ is considered to minimize the increase of distortion with respect to the decrease of the allocated bits, and thus the subtrees following node (3, 1) are pruned off by (n+1)th pruning. An optimal bit allocation tree ensuring to minimize distortion in corresponding bits can be obtained whenever step 3) is performed through the above pruning procedure.

On the other hand, in step 4), pruning of trees is repeatedly performed until the sum of the bits of all vertical end nodes is the given total number of bits $R_{total}$ or smaller.

After steps 1) to 4) are performed, the number of bits $R(i, M_i)$ assigned to the vertical end node $(i, M_i)$ is determined as an optimal number of bits to be assigned to each block.

In step 22, the entire sequence of moving pictures is VBR-coded by using the optimal number of bits assigned to each block in step 20.

As described above, the VBR video coding method of the present invention can minimize distortion resulting from coding by variably assigning a given total number of bits to each block of an entire sequence of moving pictures.

In addition, allocation of more bits to a very significant portion of a moving picture leads to a better, more uniform picture quality with a lower average bit rate than in CBR coding.

What is claimed is:

1. A variable bit rate video coding method comprising the steps of:

(a) dividing an entire sequence of moving pictures into N blocks;

(b) determining a quantizer scale group having M elements, each element being applied to MPEG I, P, and B pictures;

(c) quantizing said N blocks divided in said step (a) by said M quantizer scales determined in said step (b);

(d) producing M×N bit rate-distortion pairs as a result of said step (c);

(e) assigning optimal bits to said N blocks divided in said step (a) by applying the BFOS algorithm to said M×N bit rate-distortion pairs produced in said step (d); and (f) variable bit rate-coding an entire sequence of moving pictures by using an optimal number of bits assigned to each block in said step (e).

2. A variable bit rate video coding method as claimed in claim 1, wherein said step (e) comprises the steps of:

forming a bit allocation tree by using said M×N bit rate-distortion pairs produced in said step (d);

repeatedly pruning subtrees following a node that minimizes an increase of distortion with respect to a decrease of the number of allocated bits until the sum of the bits of all vertical end nodes in each subtree of said bit allocation tree is a given total number of bits or smaller; and determining as an optimal number of bits to be assigned to each block the number of bits assigned to the vertical end node of each subtree after said pruning.

3. A variable bit rate video coding method as claimed in claim 2, wherein said bit allocation tree is constituted of a root node having N children corresponding to blocks to be coded, and subtrees of length M being unary trees and rooted at said N children, wherein a bit rate-distortion pair $(D(i, j), R(i, j))$ produced when an ith block (i=1, . . . , N) is coded by a jth quantizer scale (j=1, . . . , M) is given to each node of said bit allocation tree excluding said root node.

4. A variable bit rate video coding method comprising the steps of:

(a) dividing an entire sequence of moving pictures into N blocks;

(b) determining a quantizer scale group having M elements, each element being applied to MPEG I, P, and B pictures;

(c) quantizing said N blocks divided in said step (a) by said M quantizer scales determined in said step (b);

(d) producing M×N bit rate-distortion pairs as a result of said step (c);

(e) assigning optimal bits to said N blocks divided in said step (a) by applying the BFOS algorithm to said M×N bit rate-distortion pairs produced in said step (d); and (f) variable bit rate-coding said entire sequence of moving pictures by using an optimal number of bits assigned to each block in said step (e), wherein in said step (b), if said M quantizer scale group $Q=\{Q_1=(Q_{1(I)}, Q_{1(P)}, Q_{1(B)}), \ldots, Q_M=(Q_{M(I)}, Q_{M(P)}, Q_{M(B)})\}$, where $Q_{j(I)} \leq Q_{j(B)}$, then $Q_{j+1(I)} \leq Q_{j(I)}$, $Q_{j+1(P)} \leq Q_{j(P)}$, and $Q_{j+1(B)} \leq Q_{j(B)}$, where j is an integer from 1 to M.

* * * * *